United States Patent
Wöhlte

(10) Patent No.: US 10,313,572 B2
(45) Date of Patent: Jun. 4, 2019

(54) VEHICLE CAMERA WITH ELECTRICALLY CONDUCTIVE FASTENER ATTACHMENT OF PCB TO HOUSING

(71) Applicant: MAGNA ELECTRONICS INC., Auburn Hills, MI (US)

(72) Inventor: Wilhelm Johann Wolfgang Wöhlte, Sailauf (DE)

(73) Assignee: MAGNA ELECTRONICS INC., Auburn Hills, MI (US)

( * ) Notice: Subject to any disclaimer, the term of this patent is extended or adjusted under 35 U.S.C. 154(b) by 71 days.

(21) Appl. No.: 15/490,173

(22) Filed: Apr. 18, 2017

(65) Prior Publication Data

US 2017/0310863 A1    Oct. 26, 2017

Related U.S. Application Data

(60) Provisional application No. 62/326,054, filed on Apr. 22, 2016.

(51) Int. Cl.
| | |
|---|---|
| *H04N 9/47* | (2006.01) |
| *H04N 5/225* | (2006.01) |
| *H04N 7/18* | (2006.01) |
| *B60R 11/04* | (2006.01) |

(52) U.S. Cl.
CPC ........... *H04N 5/2257* (2013.01); *B60R 11/04* (2013.01); *H04N 7/183* (2013.01); *B60K 2350/106* (2013.01); *B60K 2350/2013* (2013.01)

(58) Field of Classification Search
CPC ...... B60R 11/04; H04N 5/2257; H04N 7/183; B60K 2350/106; B60K 2350/2013
USPC ............. 348/148, 149, 151, 153, 159, 143; 386/223, 224, 230
See application file for complete search history.

(56) References Cited

U.S. PATENT DOCUMENTS

| | | | |
|---|---|---|---|
| 5,455,625 A * | 10/1995 | Englander | ............... B60R 11/04 348/372 |
| 5,550,677 A | 8/1996 | Schofield et al. | |
| 5,670,935 A | 9/1997 | Schofield et al. | |
| 5,949,331 A | 9/1999 | Schofield et al. | |
| 7,965,336 B2 | 6/2011 | Bingle et al. | |
| 8,503,061 B2 | 8/2013 | Uken et al. | |
| 8,542,451 B2 | 9/2013 | Lu et al. | |
| 8,866,907 B2 | 10/2014 | McElroy et al. | |
| 9,233,641 B2 | 1/2016 | Sesti et al. | |
| 9,609,757 B2 | 3/2017 | Stegerwald | |

(Continued)

*Primary Examiner* — Robert Chevalier
(74) *Attorney, Agent, or Firm* — Honigman LLP

(57) ABSTRACT

A vision system for a vehicle includes a camera configured to be disposed at a vehicle so as to have a field of view exterior of the vehicle. The camera includes a printed circuit board, a lens and a camera housing, with the printed circuit board disposed in the camera housing. The printed circuit board is attached at the housing via an electrically conductive fastener that passes through an aperture through the printed circuit board and that engages a connector portion of the housing. A head of the fastener electrically engages circuitry at the printed circuit board and an end of the fastener electrically conductively connects to an electrically conductive pin at the connector portion of the housing. The connector portion of the camera housing is configured to electrically connect to a connector of a vehicle wiring harness when the camera is disposed at the vehicle.

20 Claims, 4 Drawing Sheets

(56) References Cited

U.S. PATENT DOCUMENTS

| | | |
|---|---|---|
| 2011/0310248 A1 | 12/2011 | McElroy et al. |
| 2013/0222595 A1* | 8/2013 | Gebauer ............... H04N 5/217 348/148 |
| 2013/0242099 A1* | 9/2013 | Sauer ................... H04N 5/2257 348/148 |
| 2013/0328672 A1 | 12/2013 | Sesti et al. |
| 2013/0344736 A1 | 12/2013 | Latunski |
| 2014/0138140 A1 | 5/2014 | Sigle |
| 2014/0320636 A1 | 10/2014 | Bally et al. |
| 2014/0362209 A1 | 12/2014 | Ziegenspeck et al. |
| 2014/0373345 A1 | 12/2014 | Steigerwald |
| 2015/0222795 A1 | 8/2015 | Sauer et al. |
| 2015/0266430 A1 | 9/2015 | Mleczko et al. |
| 2015/0365569 A1 | 12/2015 | Mai et al. |
| 2016/0037028 A1 | 2/2016 | Biemer |
| 2016/0268716 A1 | 9/2016 | Conger et al. |
| 2017/0133811 A1 | 5/2017 | Conger et al. |

* cited by examiner

VEHICLE CAMERA WITH ELECTRICALLY CONDUCTIVE FASTENER ATTACHMENT OF PCB TO HOUSING

CROSS REFERENCE TO RELATED APPLICATION

The present application claims the filing benefits of U.S. provisional application Ser. No. 62/326,054, filed Apr. 22, 2016, which is hereby incorporated herein by reference in its entirety.

FIELD OF THE INVENTION

The present invention relates generally to a vehicle vision system for a vehicle and, more particularly, to a vehicle vision system that utilizes one or more cameras at a vehicle.

BACKGROUND OF THE INVENTION

Use of imaging sensors in vehicle imaging systems is common and known. Examples of such known systems are described in U.S. Pat. Nos. 5,949,331; 5,670,935 and/or 5,550,677, which are hereby incorporated herein by reference in their entireties.

SUMMARY OF THE INVENTION

The present invention provides a driver assistance system or vision system or imaging system for a vehicle that utilizes one or more cameras (preferably one or more CMOS cameras) to capture image data representative of images exterior of the vehicle, and provides a screw to mount the PCB to the camera housing, with the screw also used as a linking component between the PCB and the electrical connector at the rear of the camera housing (such as a coaxial connector or multi-pin connector or the like that is configured to electrically connect to a wiring harness of the vehicle). This configuration simplifies tolerance studies (position PCB to connector and the like), and saves production steps.

These and other objects, advantages, purposes and features of the present invention will become apparent upon review of the following specification in conjunction with the drawings.

DESCRIPTION OF THE PREFERRED EMBODIMENTS

A vehicle vision system and/or driver assist system and/or object detection system and/or alert system operates to capture images exterior of the vehicle and may process the captured image data to display images and to detect objects at or near the vehicle and in the predicted path of the vehicle, such as to assist a driver of the vehicle in maneuvering the vehicle in a rearward direction. The vision system includes an image processor or image processing system that is operable to receive image data from one or more cameras and provide an output to a display device for displaying images representative of the captured image data. Optionally, the vision system may provide display, such as a rearview display or a top down or bird's eye or surround view display or the like.

Figure 1:
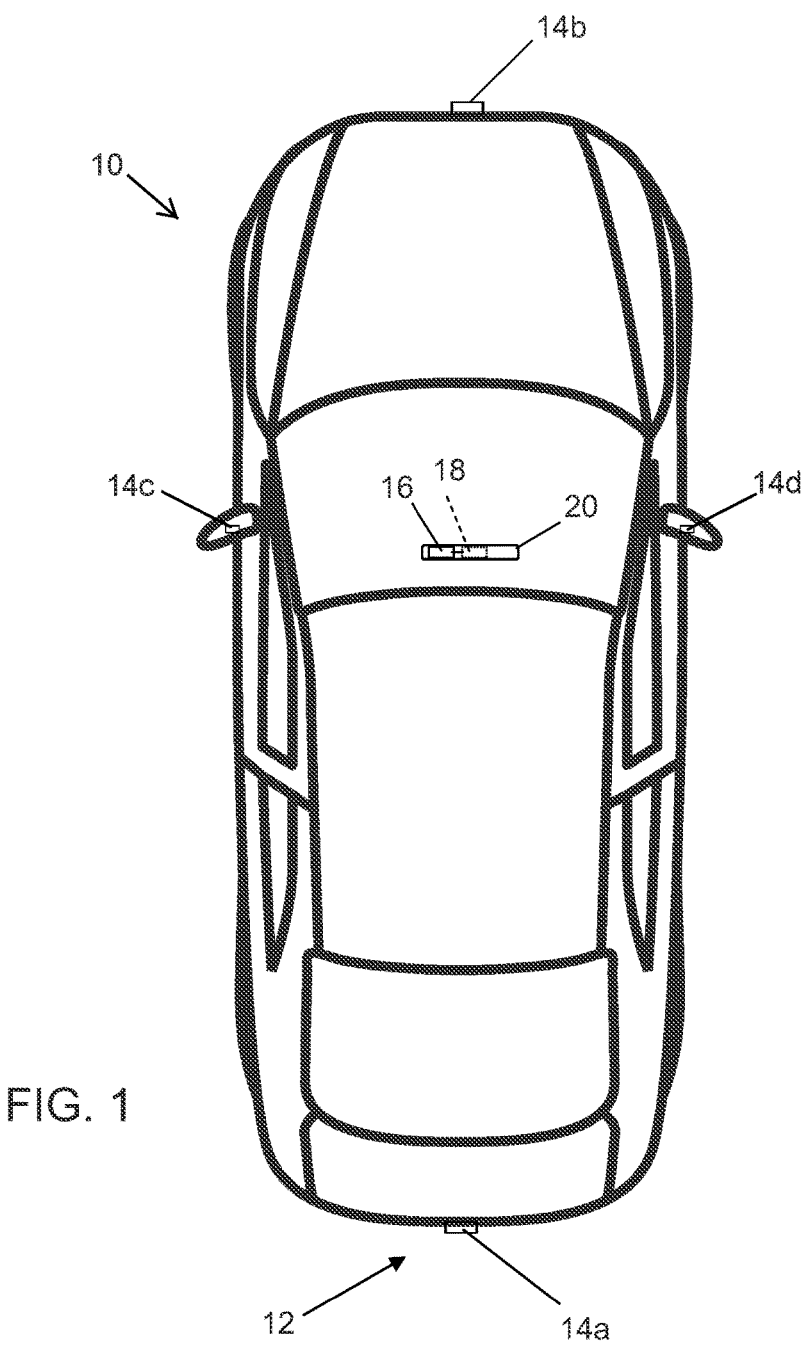
FIG. 1 is a plan view of a vehicle with a vision system that incorporates cameras in accordance with the present invention.
Figure 2:
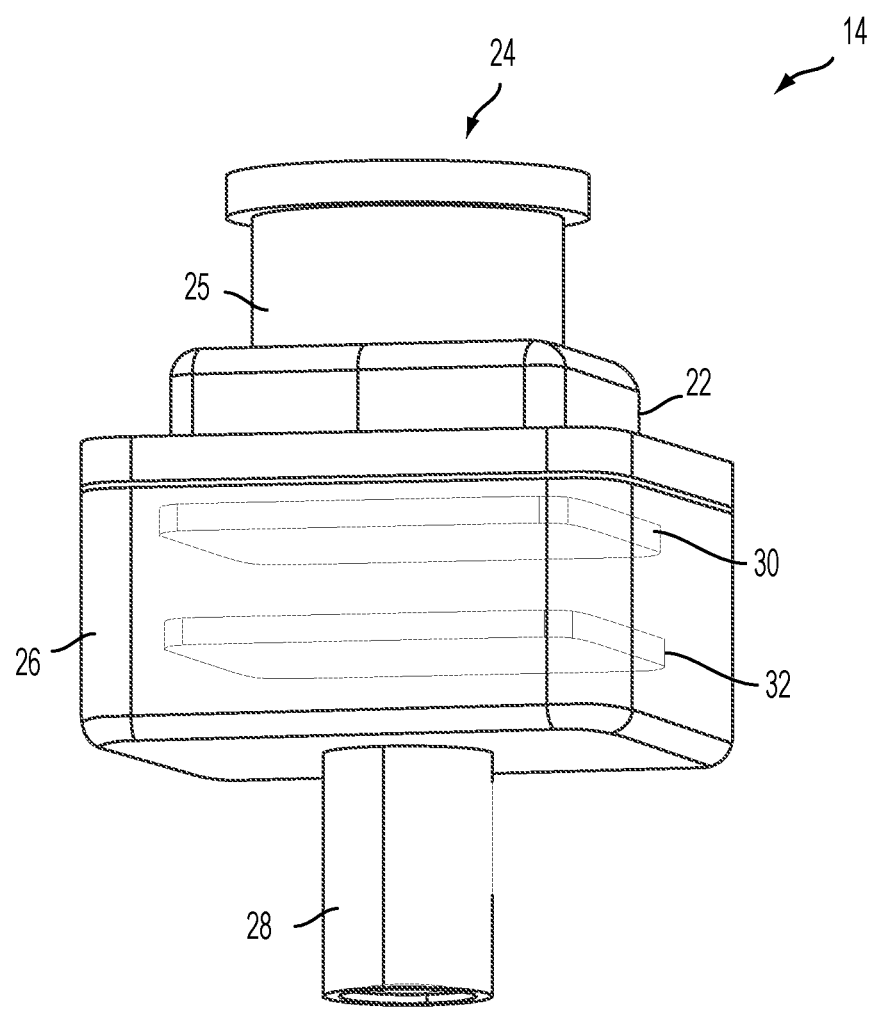
FIG. 2 is a perspective view of a camera module utilizing the electrical connection of the present invention.

Referring now to the drawings and the illustrative embodiments depicted therein, a vehicle 10 includes an imaging system or vision system 12 that includes at least one exterior facing imaging sensor or camera, such as a rearward facing imaging sensor or camera 14a (and the system may optionally include multiple exterior facing imaging sensors or cameras, such as a forwardly facing camera 14b at the front (or at the windshield) of the vehicle, and a sidewardly/rearwardly facing camera 14c, 14d at respective sides of the vehicle), which captures images exterior of the vehicle, with the camera having a lens for focusing images at or onto an imaging array or imaging plane or imager of the camera (FIG. 1). Optionally, a forward viewing camera may be disposed at the windshield of the vehicle and view through the windshield and forward of the vehicle, such as for a machine vision system (such as for traffic sign recognition, headlamp control, pedestrian detection, collision avoidance, lane marker detection and/or the like). The vision system 12 includes a control or electronic control unit (ECU) or processor 18 that is operable to process image data captured by the camera or cameras and may detect objects or the like and/or provide displayed images at a display device 16 for viewing by the driver of the vehicle (although shown in FIG. 1 as being part of or incorporated in or at an interior rearview mirror assembly 20 of the vehicle, the control and/or the display device may be disposed elsewhere at or in the vehicle). The data transfer or signal communication from the camera to the ECU may comprise any suitable data or communication link, such as a vehicle network bus or the like of the equipped vehicle.

The camera module 14 has a lens holder or front housing portion 22 that holds or supports or houses a lens assembly 24 (which is disposed in a lens barrel 25) and that is attached at a rear housing 26 (that can be metal or plastic) in which an imager printed circuit board (PCB) 30 is disposed. The imager may be adjustably positioned at the housing and optically aligned with the lens of the lens holder (which may be adhesively attached at the housing) and then secured relative to the housing via fasteners or screws or the like. Optionally, the lens holder may be adhesively attached at the housing after the imager PCB is attached at the housing, whereby the optical alignment of the lens and imager is done by adjusting the lens holder relative to the housing and then curing the adhesive to secure the lens holder and lens relative to the housing and imager (such as by utilizing aspects of the cameras described in U.S. Pat. Nos. 8,542,451 and/or 9,277,104, and/or U.S. Publication No. US-2015-0124098, which are hereby incorporated herein by reference in their entireties). The camera may utilize aspects of the cameras described in U.S. Publication Nos. US-2016-0268716 and/or US-2016-0286103, and/or U.S. patent application Ser. No. 15/467,246, filed Mar. 23, 2017, which published on Jul. 13, 2017 as U.S. Patent Publication No. US-2017-0201661, Ser. No. 15/460,665, filed Mar. 16, 2017, which published on Sep. 28, 2017 as U.S. Patent Publication No. US-2017-0280034, Ser. No. 15/478,274, filed Apr. 4, 2017, now U.S. Pat. No. 10,142,532, and/or Ser.

No. 15/487,459, filed Apr. 14, 2017, which published on Oct. 19, 2017 as U.S. Patent Publication No. US-2017-0302829, which are hereby incorporated herein by reference in their entireties.

Figure 3:
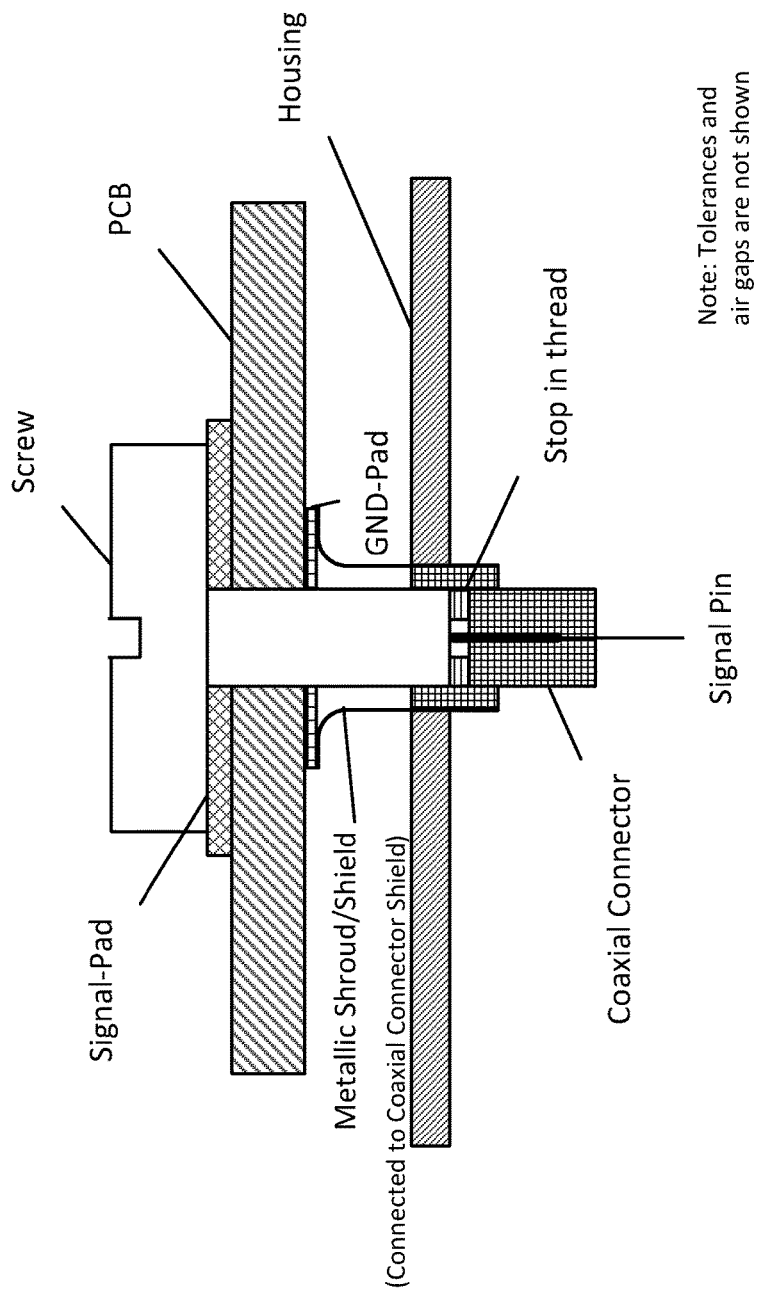
FIG. 3 is a side elevation and partial sectional view of the fastener or screw that secures the PCB to the housing and provides a signal path in accordance with the present invention.
Figure 4:
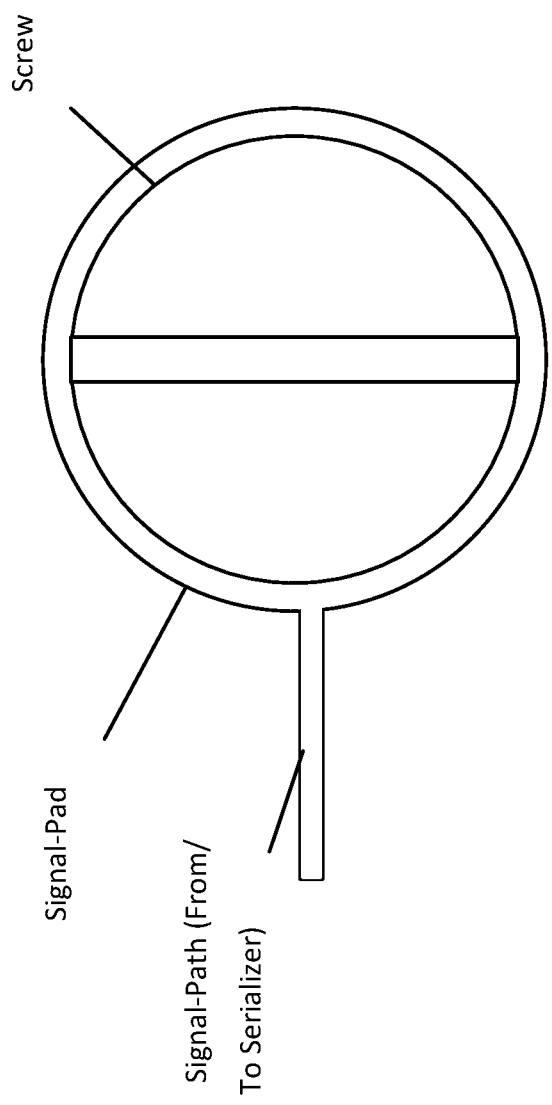
FIG. 4 is a plan view of the fastener and signal pad of FIG. 3.

The present invention provides for use of a screw for mounting the PCB, such as the imager PCB 30 or a second or connector PCB 32 (which may be disposed in the housing and electrically connected to circuitry of the imager PCB, such as via one or more electrical connectors or cables or terminals or the like), into the housing and as a signal (+power) path. For example, and such as shown in FIG. 3, a metallic screw or bolt or fastener, which is used to mount the PCB within a housing of an automotive camera, can be used as signal path from the connector to the PCB.

The housing 26 includes a coaxial electrical connector 28 molded in the housing. The part of the connector which is inside of the housing is threaded so as to threadedly engage the screw or fastener when the fastener is threaded into the connector to attach the PCB at the housing. As shown in FIG. 3, the PCB has a signal pad with a hole in it. The signal pad is fed by an integrated circuit (IC) such as a LVDS-Serializer or the like. Power and LVDS (low voltage differential signaling) over coax is applicable here as well.

The fastener or screw is used as a linking component between the PCB and the electrical connector. This configuration simplifies tolerance studies (position PCB to connector, and the like), and saves production steps.

The signal pin may be spring loaded or biased toward engagement with the end of the fastener or screw to ensure that the connection between the connector signal pin and the fastener or screw is sufficient enough and to protect the connector from being damaged if too much torque is applied to the screw. A stop in the threads of the connector can be used to realize that every PCB will have the same distance to the housing.

The shield connection of the coax interface is also connected to the PCB. This is realized by using a metallic shroud. The shroud is round or cylindrical-shaped and (as shown in FIG. 3) covers the whole exposed thread of the screw. This will limit or prevent radiation from the screw in the cavity between PCB and housing. The shield is connected to a ground (GND) pad on the bottom side of the PCB. The pad is realized in the same way as the signal pad. A dedicated signal pad can be used or the solder stop on a GND plane can be pulled back to realize the connection between the PCB (GND) and the shield.

The connector needs to support an insolation between the shield connection and the connection area for the screw. Outside of the device standard FAKRA/Coax connectors and cables can be used to connect to the exterior portion of the connector of the housing and to electrically connect to the terminals or pins or conductive elements of the connector of the camera housing.

The camera thus may include electrical connecting elements that accommodate tolerances in the housing and/or PCB mounting and/or connector portion. The electrical connecting elements may utilize aspects of the cameras and electrical connectors described in U.S. Pat. Nos. 9,621,769 and/or 9,233,641, and/or U.S. Publication Nos. US-2016-0268716; US-2013-0242099; US-2014-0373345; US-2015-0222795; US-2015-0266430 and/or US-2016-0037028, and/or U.S. patent application Ser. No. 15/341,048, filed Nov. 2, 2016, which published on May 11, 2017 as U.S. Patent Publication No. US-2017-0133811, Ser. No. 15/467,246, filed Mar. 23, 2017, which published on Jul. 13, 2017 as U.S. Patent Publication No. US-2017-0201661, Ser. No. 15/478, 274, filed Apr. 4, 2017, now U.S. Pat. No. 10,142,532, and/or Ser. No. 15/487,459, filed Apr. 14, 2017, which published on Oct. 19, 2017 as U.S. Patent Publication No. US-2017-0302829, which are hereby incorporated herein by reference in their entireties.

The camera or sensor may comprise any suitable camera or sensor. Optionally, the camera may comprise a "smart camera" that includes the imaging sensor array and associated circuitry and image processing circuitry and electrical connectors and the like as part of a camera module, such as by utilizing aspects of the vision systems described in International Publication Nos. WO 2013/081984 and/or WO 2013/081985, which are hereby incorporated herein by reference in their entireties.

The system includes an image processor operable to process image data captured by the camera or cameras, such as for detecting objects or other vehicles or pedestrians or the like in the field of view of one or more of the cameras. For example, the image processor may comprise an image processing chip selected from the EyeQ family of image processing chips available from Mobileye Vision Technologies Ltd. of Jerusalem, Israel, and may include object detection software (such as the types described in U.S. Pat. Nos. 7,855,755; 7,720,580 and/or 7,038,577, which are hereby incorporated herein by reference in their entireties), and may analyze image data to detect vehicles and/or other objects. Responsive to such image processing, and when an object or other vehicle is detected, the system may generate an alert to the driver of the vehicle and/or may generate an overlay at the displayed image to highlight or enhance display of the detected object or vehicle, in order to enhance the driver's awareness of the detected object or vehicle or hazardous condition during a driving maneuver of the equipped vehicle.

The vehicle may include any type of sensor or sensors, such as imaging sensors or radar sensors or lidar sensors or ladar sensors or ultrasonic sensors or the like. The imaging sensor or camera may capture image data for image processing and may comprise any suitable camera or sensing device, such as, for example, a two dimensional array of a plurality of photosensor elements arranged in at least 640 columns and 480 rows (at least a 640×480 imaging array, such as a megapixel imaging array or the like), with a respective lens focusing images onto respective portions of the array. The photosensor array may comprise a plurality of photosensor elements arranged in a photosensor array having rows and columns. Preferably, the imaging array has at least 300,000 photosensor elements or pixels, more preferably at least 500,000 photosensor elements or pixels and more preferably at least 1 million photosensor elements or pixels. The imaging array may capture color image data, such as via spectral filtering at the array, such as via an RGB (red, green and blue) filter or via a red/red complement filter or such as via an RCC (red, clear, clear) filter or the like. The logic and control circuit of the imaging sensor may function in any known manner, and the image processing and algorithmic processing may comprise any suitable means for processing the images and/or image data.

For example, the vision system and/or processing and/or camera and/or circuitry may utilize aspects described in U.S. Pat. Nos. 9,233,641; 9,146,898; 9,174,574; 9,090,234; 9,077,098; 8,818,042; 8,886,401; 9,077,962; 9,068,390; 9,140,789; 9,092,986; 9,205,776; 8,917,169; 8,694,224; 7,005,974; 5,760,962; 5,877,897; 5,796,094; 5,949,331; 6,222,447; 6,302,545; 6,396,397; 6,498,620; 6,523,964; 6,611,202; 6,201,642; 6,690,268; 6,717,610; 6,757,109; 6,802,617; 6,806,452; 6,822,563; 6,891,563; 6,946,978; 7,859,565; 5,550,677; 5,670,935; 6,636,258; 7,145,519;

7,161,616; 7,230,640; 7,248,283; 7,295,229; 7,301,466; 7,592,928; 7,881,496; 7,720,580; 7,038,577; 6,882,287; 5,929,786 and/or 5,786,772, and/or U.S. Publication Nos. US-2014-0340510; US-2014-0313339; US-2014-0347486; US-2014-0320658; US-2014-0336876; US-2014-0307095; US-2014-0327774; US-2014-0327772; US-2014-0320636; US-2014-0293057; US-2014-0309884; US-2014-0226012; US-2014-0293042; US-2014-0218535; US-2014-0218535; US-2014-0247354; US-2014-0247355; US-2014-0247352; US-2014-0232869; US-2014-0211009; US-2014-0160276; US-2014-0168437; US-2014-0168415; US-2014-0160291; US-2014-0152825; US-2014-0139676; US-2014-0138140; US-2014-0104426; US-2014-0098229; US-2014-0085472; US-2014-0067206; US-2014-0049646; US-2014-0052340; US-2014-0025240; US-2014-0028852; US-2014-005907; US-2013-0314503; US-2013-0298866; US-2013-0222593; US-2013-0300869; US-2013-0278769; US-2013-0258077; US-2013-0258077; US-2013-0242099; US-2013-0215271; US-2013-0141578 and/or US-2013-0002873, which are all hereby incorporated herein by reference in their entireties. The system may communicate with other communication systems via any suitable means, such as by utilizing aspects of the systems described in International Publication Nos. WO/2010/144900; WO 2013/043661 and/or WO 2013/081985, and/or U.S. Pat. No. 9,126,525, which are hereby incorporated herein by reference in their entireties.

Optionally, the vision system may include a display for displaying images captured by one or more of the imaging sensors for viewing by the driver of the vehicle while the driver is normally operating the vehicle. Optionally, for example, the vision system may include a video display device, such as by utilizing aspects of the video display systems described in U.S. Pat. Nos. 5,530,240; 6,329,925; 7,855,755; 7,626,749; 7,581,859; 7,446,650; 7,338,177; 7,274,501; 7,255,451; 7,195,381; 7,184,190; 5,668,663; 5,724,187; 6,690,268; 7,370,983; 7,329,013; 7,308,341; 7,289,037; 7,249,860; 7,004,593; 4,546,551; 5,699,044; 4,953,305; 5,576,687; 5,632,092; 5,677,851; 5,708,410; 5,737,226; 5,802,727; 5,878,370; 6,087,953; 6,173,508; 6,222,460; 6,513,252 and/or 6,642,851, and/or U.S. Publication Nos. US-2012-0162427; US-2006-0050018 and/or US-2006-0061008, which are all hereby incorporated herein by reference in their entireties. Optionally, the vision system (utilizing the forward facing camera and a rearward facing camera and other cameras disposed at the vehicle with exterior fields of view) may be part of or may provide a display of a top-down view or birds-eye view system of the vehicle or a surround view at the vehicle, such as by utilizing aspects of the vision systems described in International Publication Nos. WO 2010/099416; WO 2011/028686; WO 2012/075250; WO 2013/019795; WO 2012/075250; WO 2012/145822; WO 2013/081985; WO 2013/086249 and/or WO 2013/109869, and/or U.S. Publication No. US-2012-0162427, which are hereby incorporated herein by reference in their entireties.

Changes and modifications in the specifically described embodiments can be carried out without departing from the principles of the invention, which is intended to be limited only by the scope of the appended claims, as interpreted according to the principles of patent law including the doctrine of equivalents.

The invention claimed is:

1. A vision system for a vehicle, said vision system comprising:
   a camera configured to be disposed at a vehicle so as to have a field of view exterior of the vehicle;
   wherein said camera comprises an imager;
   wherein said camera comprises circuitry disposed at a printed circuit board;
   wherein said printed circuit board has an electrically conductive pad disposed at an aperture through said printed circuit board, and wherein said electrically conductive pad is electrically conductively connected to circuitry of said printed circuit board;
   wherein said camera comprises a lens and a camera housing, and wherein said printed circuit board is disposed in said camera housing;
   wherein said printed circuit board is attached at said housing via an electrically conductive fastener that passes through said aperture of said printed circuit board and that engages a connector portion of said camera housing;
   wherein a head of said fastener electrically engages said electrically conductive pad at said printed circuit board and wherein an end of said fastener electrically conductively connects to an electrically conductive pin at said connector portion of said camera housing; and
   wherein said connector portion of said camera housing is configured to electrically connect to a connector of a vehicle wiring harness when said camera is disposed at the vehicle.

2. The vision system of claim 1, wherein said electrically conductive pin at said connector portion comprises a spring-loaded pin that is biased towards engagement with said end of said fastener.

3. The vision system of claim 1, wherein said connector portion of said camera housing comprises a threaded connector portion, and wherein end of said electrically conductive fastener threadedly engages said threaded connector portion of said camera housing.

4. The vision system of claim 3, wherein said threaded connector portion is only partially threaded so that the threads limit threading of said end of said fastener into said threaded connector portion.

5. The vision system of claim 1, wherein said electrically conductive pin is an electrically conductive element of a coaxial connector, and wherein another electrically conductive element of said coaxial connector engages a metallic shroud that electrically conductively connects to a ground pad at said printed circuit board.

6. A vision system for a vehicle, said vision system comprising:
   a camera configured to be disposed at a vehicle so as to have a field of view exterior of the vehicle;
   wherein said camera comprises an imager;
   wherein said camera comprises circuitry disposed at a printed circuit board;
   wherein said printed circuit board has an electrically conductive pad disposed at an aperture through said printed circuit board, and wherein said electrically conductive pad is electrically conductively connected to circuitry of said printed circuit board;
   wherein said camera comprises a lens and a camera housing, and wherein said printed circuit board is disposed in said camera housing;
   wherein said printed circuit board is attached at said housing via an electrically conductive fastener that passes through said aperture of said printed circuit board and that engages a connector portion of said camera housing;
   wherein a head of said fastener electrically engages said electrically conductive pad at said printed circuit board and wherein an end of said fastener electrically conductively connects to an electrically conductive pin at said connector portion of said camera housing;

wherein said connector portion of said camera housing is configured to electrically connect to a connector of a vehicle wiring harness when said camera is disposed at the vehicle;

wherein said electrically conductive pin is an electrically conductive element of a coaxial connector, and wherein another electrically conductive element of said coaxial connector engages a metallic shroud that electrically conductively connects to a ground pad at said printed circuit board; and wherein said head of said fastener engages circuitry at a front side of said printed circuit board and said metallic shroud electrically conductively connects to said ground pad at a rear side of said printed circuit board opposite said front side.

7. The vision system of claim 1, wherein said camera housing comprises a front camera housing portion and a rear camera housing portion.

8. The vision system of claim 7, wherein said lens is disposed at said front camera housing portion, and wherein said connector portion is formed at said rear camera housing portion.

9. The vision system of claim 8, wherein said printed circuit board is attached at said connector portion of said rear camera housing before said front and rear camera housing portions are mated together to seal said printed circuit board within said camera housing.

10. The vision system of claim 1, wherein said printed circuit board comprises a connector printed circuit board, and wherein said imager is disposed at an imager printed circuit board, and wherein circuitry of said connector printed circuit board is electrically connected to circuitry of said imager printed circuit board.

11. A vision system for a vehicle, said vision system comprising:

a camera configured to be disposed at a vehicle so as to have a field of view exterior of the vehicle;

wherein said camera comprises an imager disposed at an imager circuit board;

wherein said camera comprises circuitry disposed at a connector circuit board;

wherein circuitry of said connector circuit board is electrically connected to circuitry of said imager circuit board;

wherein said connector circuit board has an electrically conductive pad disposed at an aperture through said connector circuit board, and wherein said electrically conductive pad is electrically conductively connected to circuitry of said connector circuit board;

wherein said camera comprises a lens and a camera housing, and wherein said imager circuit board and said connector circuit board are disposed in said camera housing;

wherein said connector circuit board is attached at said housing via an electrically conductive fastener that passes through said aperture of said connector circuit board and that threadedly engages a threaded connector portion of said camera housing;

wherein a head of said fastener electrically engages said electrically conductive pad at said connector circuit board and wherein an end of said fastener electrically conductively connects to an electrically conductive pin at said threaded connector portion of said camera housing; and wherein said threaded connector portion of said camera housing is configured to electrically connect to a connector of a vehicle wiring harness when said camera is disposed at the vehicle.

12. The vision system of claim 11, wherein said electrically conductive pin at said threaded connector portion comprises a spring-loaded pin that is biased towards engagement with said end of said fastener.

13. The vision system of claim 11, wherein said threaded connector portion is only partially threaded so that the threads limit threading of said end of said fastener into said threaded connector portion.

14. The vision system of claim 11, wherein said electrically conductive pin is an electrically conductive element of a coaxial connector, and wherein another electrically conductive element of said coaxial connector engages a metallic shroud that electrically conductively connects to a ground pad at said connector circuit board.

15. A vision system for a vehicle, said vision system comprising:

a camera configured to be disposed at a vehicle so as to have a field of view exterior of the vehicle;

wherein said camera comprises an imager disposed at an imager circuit board;

wherein said camera comprises circuitry disposed at a connector circuit board;

wherein circuitry of said connector circuit board is electrically connected to circuitry of said imager circuit board;

wherein said connector circuit board has an electrically conductive pad disposed at an aperture through said connector circuit board, and wherein said electrically conductive pad is electrically conductively connected to circuitry of said connector circuit board;

wherein said camera comprises a lens and a camera housing, and wherein said imager circuit board and said connector circuit board are disposed in said camera housing;

wherein said connector circuit board is attached at said housing via an electrically conductive fastener that passes through said aperture of said connector circuit board and that threadedly engages a threaded connector portion of said camera housing;

wherein a head of said fastener electrically engages said electrically conductive pad at said connector circuit board and wherein an end of said fastener electrically conductively connects to an electrically conductive pin at said threaded connector portion of said camera housing;

wherein said threaded connector portion of said camera housing is configured to electrically connect to a connector of a vehicle wiring harness when said camera is disposed at the vehicle;

wherein said electrically conductive pin is an electrically conductive element of a coaxial connector, and wherein another electrically conductive element of said coaxial connector engages a metallic shroud that electrically conductively connects to a ground pad at said connector circuit board; and wherein said head of said fastener engages circuitry at a front side of said connector circuit board and said metallic shroud electrically conductively connects to said ground pad at a rear side of said connector circuit board opposite said front side.

16. A vision system for a vehicle, said vision system comprising:

a camera configured to be disposed at a vehicle so as to have a field of view exterior of the vehicle;

wherein said camera comprises an imager;

wherein said camera comprises circuitry disposed at a printed circuit board;

wherein said printed circuit board has an electrically conductive pad disposed at an aperture through said printed circuit board, and wherein said electrically conductive pad is electrically conductively connected to circuitry of said printed circuit board;

wherein said camera comprises a lens and a camera housing, and wherein said printed circuit board is disposed in said camera housing;

wherein said camera housing comprises a front camera housing portion and a rear camera housing portion, and wherein said lens is disposed at said front camera housing portion;

wherein said printed circuit board is attached at said rear camera housing portion via an electrically conductive fastener that passes through said aperture of said printed circuit board and that engages a connector portion of said rear camera housing portion;

wherein said connector portion of said rear camera housing portion comprises a threaded connector portion, and wherein end of said electrically conductive fastener threadedly engages said threaded connector portion of said rear camera housing portion;

wherein a head of said fastener electrically engages said electrically conductive pad at said printed circuit board and wherein an end of said fastener electrically conductively connects to an electrically conductive pin at said connector portion of said rear camera housing portion; and wherein said connector portion of said rear camera housing portion is configured to electrically connect to a connector of a vehicle wiring harness when said camera is disposed at the vehicle.

17. The vision system of claim 16, wherein said electrically conductive pin at said connector portion comprises a spring-loaded pin that is biased towards engagement with said end of said fastener.

18. A vision system for a vehicle, said vision system comprising:

a camera configured to be disposed at a vehicle so as to have a field of view exterior of the vehicle;

wherein said camera comprises an imager;

wherein said camera comprises circuitry disposed at a printed circuit board;

wherein said printed circuit board has an electrically conductive pad disposed at an aperture through said printed circuit board, and wherein said electrically conductive pad is electrically conductively connected to circuitry of said printed circuit board;

wherein said camera comprises a lens and a camera housing, and wherein said printed circuit board is disposed in said camera housing;

wherein said camera housing comprises a front camera housing portion and a rear camera housing portion, and wherein said lens is disposed at said front camera housing portion;

wherein said printed circuit board is attached at said rear camera housing portion via an electrically conductive fastener that passes through said aperture of said printed circuit board and that engages a connector portion of said rear camera housing portion;

wherein said connector portion of said rear camera housing portion comprises a threaded connector portion, and wherein end of said electrically conductive fastener threadedly engages said threaded connector portion of said rear camera housing portion;

wherein a head of said fastener electrically engages said electrically conductive pad at said printed circuit board and wherein an end of said fastener electrically conductively connects to an electrically conductive pin at said connector portion of said rear camera housing portion;

wherein said connector portion of said rear camera housing portion is configured to electrically connect to a connector of a vehicle wiring harness when said camera is disposed at the vehicle; and wherein said electrically conductive pin is an electrically conductive element of a coaxial connector, and wherein another electrically conductive element of said coaxial connector engages a metallic shroud that electrically conductively connects to a ground pad at said printed circuit board, and wherein said head of said fastener engages circuitry at a front side of said printed circuit board and said metallic shroud electrically conductively connects to said ground pad at a rear side of said printed circuit board opposite said front side.

19. The vision system of claim 16, wherein said printed circuit board is attached at said connector portion of said rear camera housing before said front and rear camera housing portions are mated together to seal said printed circuit board within said camera housing.

20. The vision system of claim 16, wherein said printed circuit board comprises a connector printed circuit board, and wherein said imager is disposed at an imager printed circuit board, and wherein circuitry of said connector printed circuit board is electrically connected to circuitry of said imager printed circuit board.

* * * * *